D. E. SWINEHART.
LOADING AND UNLOADING TRUCK.
APPLICATION FILED SEPT. 8, 1920.
1,404,069.
Patented Jan. 17, 1922.
3 SHEETS—SHEET 1.
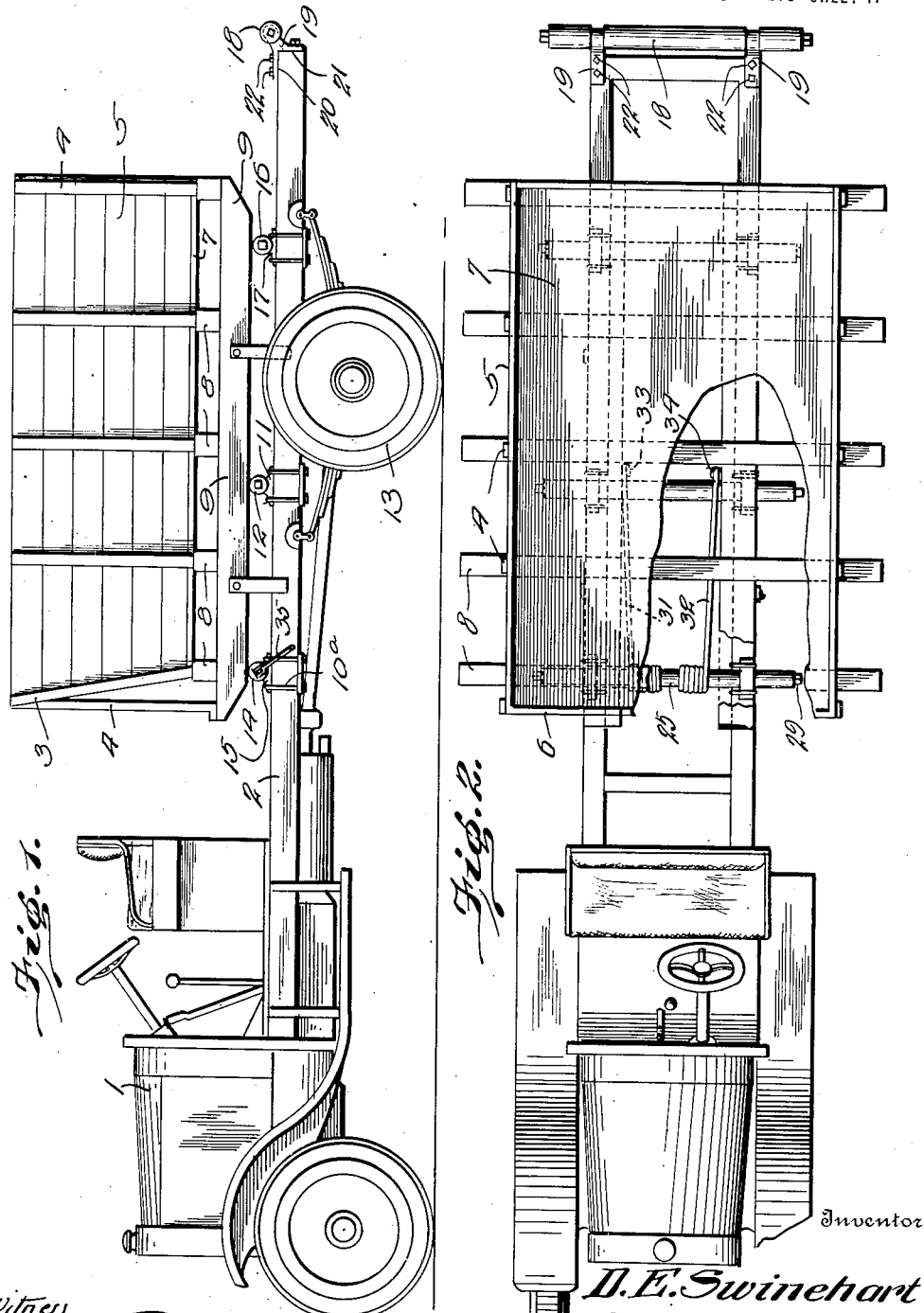

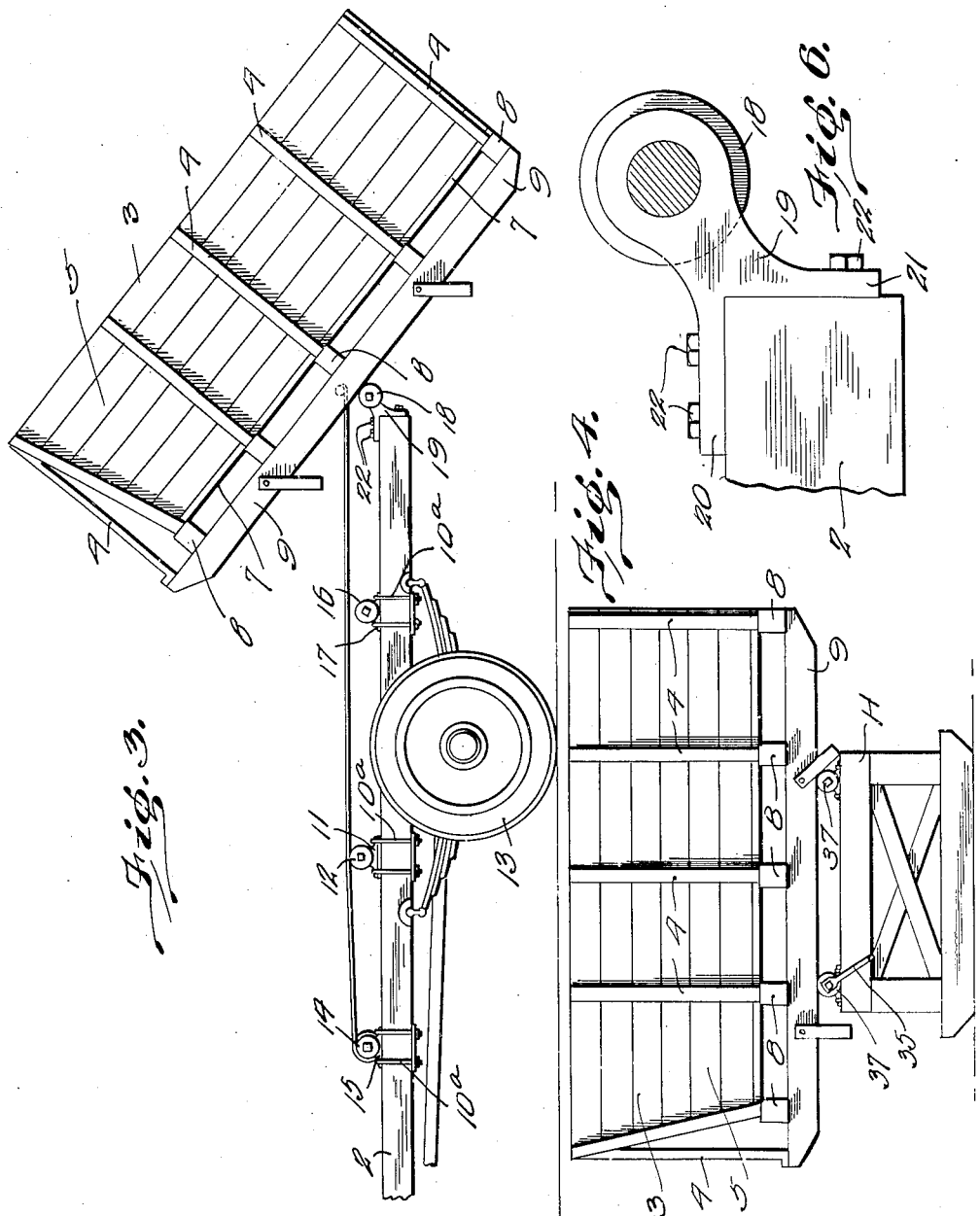

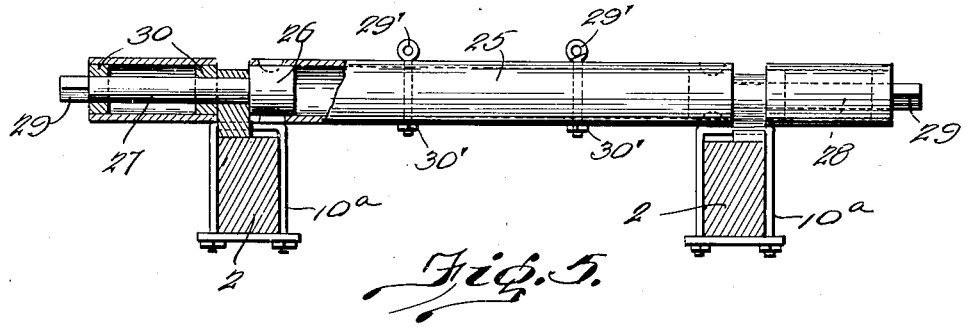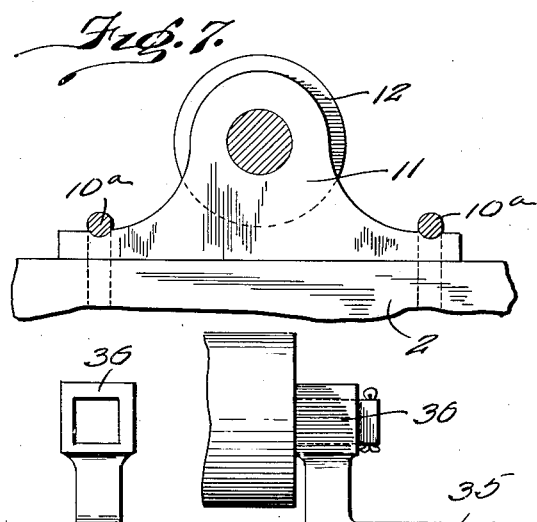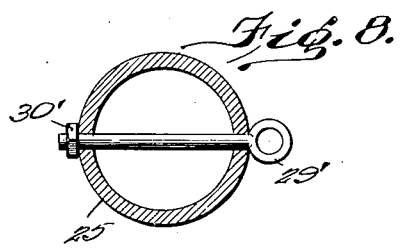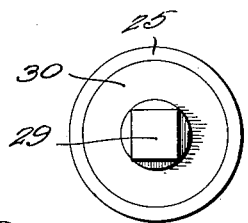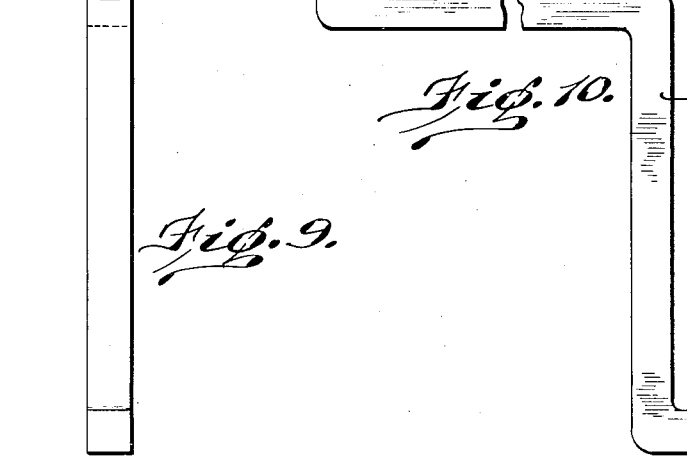

UNITED STATES PATENT OFFICE.

DERLAND E. SWINEHART, OF MISSOULA, MONTANA.

LOADING AND UNLOADING TRUCK.

1,404,069. Specification of Letters Patent. Patented Jan. 17, 1922.

Application filed September 8, 1920. Serial No. 408,894.

*To all whom it may concern:*

Be it known that I, DERLAND E. SWINEHART, a citizen of the United States, residing at Missoula, in the county of Missoula and State of Montana, have invented certain new and useful Improvements in a Loading and Unloading Truck, of which the following is a specification.

My invention relates to loading and unloading trucks, and more especially that class consisting of a dump body mounted to slide and tilt with respect to the chassis of a vehicle.

One of the objects of my invention resides in the construction of a truck having a removable dump body slidably mounted on the chassis of a vehicle and means to tilt the said body at the rear end of the chassis.

A still further object of my invention resides in the provision of novel roller supporting means for a slidable dump body whereby the same may be easily and conveniently removed from the chassis of a vehicle or tilted longitudinal with respect thereto.

With these objects in view and others which will be suggested as the nature and purpose of my invention are revealed in the following specification and drawing, wherein I have shown a preferred embodiment, it being understood that various changes in the precise structure may be resorted to without departing from the spirit of the invention.

Figure 1 is a perspective of a motor vehicle and the removable dump body.

Fig. 2 is a plan.

Fig. 3 is a view similar to Fig. 1 showing the dump body being tilted.

Fig. 4 is a perspective view showing the removable dump body and a supporting means therefor.

Fig. 5 is a view of the front supporting roller.

Fig. 6 shows the supporting bracket for the rear or end roller.

Figs. 7, 8, 9, 10 and 11 are details.

Similar numerals in the specification referring to corresponding parts on the drawing, I have shown a motor vehicle 1 having the usual chassis 2 on which a dumping body 3 is carried. The body 3 may be of any closed or open construction having vertical uprights 4, sides and front 5, 6 and a bottom 7. The bottom of the body rests on transverse beams 8 which connect the longitudinally extending side skids 9 and the central skids 10.

In order to slidably support the dump body on the chassis, I provide a series of rollers, preferably three in number, rotatably supported in suitable boxings or bearings which are clamped to the chassis by U-shaped bolts 10ª. The central bearings 11 and the supporting roller 12 are positioned forward of the rear wheels 13, the said bearings 11 being slightly raised by shimming under the bearings so that the central roller will be slightly higher than the front roller 14 and its bearings 15.

The rear roller 16 and its bearings 17 are in turn slightly lower than the central roller and its bearings, it being apparent that by this arrangement the body 3 may be easily and conveniently moved on the chassis.

Referring to Figs. 1 and 3 it will be seen that I provide a fourth roller 18 mounted in a solid boxing or bearings 19, secured to the top and ends of the chassis as at 20, 21 by suitable bolts 22. The fourth roller 18 extends somewhat beyond the end of the chassis and is slightly lower than the forward, first roller 14, the object in mounting the rear roller lower being to insure that sufficient weight will be placed on the central roller when it is desired to unload.

Referring to Fig. 6 it will be seen that the front roller comprises three sections, the middle or central portion 25 extending between the boxings or bearings, having its ends shrunk onto solid pieces of steel shafting 26. The shafting is turned down to the bore of the boxings and short sections 27, 28 having squared ends 29 are shrunk onto collars 30 keyed to the shaft 25, thereby permitting the ends of roller to be removed from the boxing and also permits the use of solid cast bearings. The short sections 27, 28 extend outside the chassis proper and support the side skids 9 of the dump body. The front roller is apertured to receive a pair of eyebolts 29 secured by nuts 30 and attached thereto are cables 31, 32 which are connected as at 33, 34 to the inner sides of the members 9 at a point centrally of the body. A crank designated 35 has a squared end 36 and a long right angle handle portion 37 whereby the crank may rotate any one of the rollers and from either side as is obvious. When not in use, the crank 35 may be reversed from its operative position and its right angle handle portion retained between the chassis and the skids thereby constituting a locking device for the roller.

When it is desired to transport an interchangeable body however, such as indicated by Fig. 4, the truck is backed up to the said body resting on a loading horse H and the crank 35 is applied to the roller 37 on the horse until the body engages the rolls on the truck. The crank 35 is then applied to the truck rolls and the cables 31, 32 attached to the side skids. By applying the crank to the front roll it will be apparent that said roll becomes a drum for the cables. To prevent the dump body from slipping or moving transversely of the chassis, I provide a pair of pivoted guards 38 on the sides of the skids 9 to engage the chassis, the guards sliding over the rollers as the body is moved on or off the truck.

When it is desired to unload or dump the body, the crank is of course, applied to the roller having the most weight thereon until the body is moved to the next roller and so on.

From the foregoing it will be seen that I have provided a novel loading and unloading truck which is capable of a variety of uses in transporting and handling bodies of great weight and size. While I have shown and described my invention and its application in handling a dump body, it is obvious that it is also capable of other uses.

From the foregoing description it will be seen that I have provided simple and efficient means to accomplish the objects of the invention, it being a preferred embodiment which I have found to be highly practical, comprising but few parts, which are not likely to get out of order, easily operable by unskilled labor, and easily installed on any commercial truck chassis.

Having shown and described my invention, what I now claim and desire to secure by Letters Patent of the U. S. is:—

What I claim is:

1. In a loading and unloading device, a wheeled truck, a chassis, transverse rollers on said chassis supported in front of the rear wheels and similar transverse rollers rearwardly of said wheels, bearings for each of said rollers clamped to the chassis, a removable dump body, means connecting the said dump body with the foremost roller, and means for loading the said body on the chassis by said foremost roller.

2. In a loading and unloading device, a wheeled truck, a chassis, rollers mounted on the chassis in front of the rear wheels and additional rollers on the chassis supported rearwardly of said wheels, all of said rollers extending outside the chassis, a removable body, flexible elements connecting said body with the front roller, said body being supported by certain of the other rollers, and means to roll said body on and off the chassis for the purpose specified.

3. In a loading and unloading device, a wheeled truck, a chassis, a plurality of rollers mounted transversely of said chassis, bearings on said chassis and supporting said rollers, each of said rollers comprising a central shaft, collars keyed to said shaft and provided with short stub shafts extending beyond the sides of the chassis, cable retaining means on the front roller member only, a removable body, cables secured to said removable body and said front roller, and means to roll said body on the chassis by successively operating the said rollers.

4. In a loading and unloading structure of the class described, a wheeled truck, a chassis, a plurality of equally spaced transverse rollers and bearings therefor mounted on said chassis, an end roller, a bearing for said end roller mounted on the top and end of said chassis, a removable dump body resting on certain of said rollers, guards pivotally secured to said body to prevent side movement thereof, and means to load or unload the said body by successively operating said rollers.

5. In a loading and unloading device of the class described, a wheeled truck, a chassis, a plurality of rollers transversely mounted on said chassis, each of said rollers having squared ends, a removable dump body resting on certain of said rollers, a removable crank for operating any one of said rollers to roll said body on and off the truck, and a reversible crank cooperating with the squared ends of said rollers for locking the same to prevent longitudinal movement of the body.

In testimony whereof I affix my signature hereto.

DERLAND E. SWINEHART.